US012628729B2

(12) United States Patent
Rains

(10) Patent No.: US 12,628,729 B2
(45) Date of Patent: May 19, 2026

(54) CONTROLLING IMAGE CAPTURE BASED ON EVENT TIMING DURING PLANTING OPERATION

(71) Applicant: Deere & Company, Moline, IL (US)

(72) Inventor: Gerald E. Rains, Eldridge, IA (US)

(73) Assignee: Deere & Company, Moline, IL (US)

( * ) Notice: Subject to any disclaimer, the term of this patent is extended or adjusted under 35 U.S.C. 154(b) by 213 days.

(21) Appl. No.: 18/535,673

(22) Filed: Dec. 11, 2023

(65) Prior Publication Data

US 2024/0196787 A1 Jun. 20, 2024

Related U.S. Application Data

(60) Provisional application No. 63/476,298, filed on Dec. 20, 2022.

(51) Int. Cl.
| *A01C 11/00* | (2006.01) |
| *A01C 11/02* | (2006.01) |
| *A01C 21/00* | (2006.01) |
| *H04N 23/60* | (2023.01) |

(52) U.S. Cl.
CPC ............ *A01C 11/006* (2013.01); *A01C 11/02* (2013.01); *A01C 21/005* (2013.01); *H04N 23/64* (2023.01); *H04N 23/665* (2023.01)

(58) Field of Classification Search
None
See application file for complete search history.

(56) References Cited

U.S. PATENT DOCUMENTS

| 9,232,687 B2 | 1/2016 | Bassett |
| 11,445,658 B2 | 9/2022 | Garner et al. |
| 11,622,493 B2 | 4/2023 | Arnett et al. |
| 2013/0269578 A1* | 10/2013 | Grimm ..................... A01C 7/06 |
| | | 111/127 |
| 2019/0232313 A1* | 8/2019 | Grimm ................. B05B 12/085 |
| 2019/0373801 A1 | 12/2019 | Schoeny et al. |
| 2020/0253107 A1 | 8/2020 | Madison et al. |
| 2021/0307236 A1 | 10/2021 | Strnad et al. |
| 2022/0071192 A1* | 3/2022 | Benoit-Levy ......... G06F 18/214 |
| 2022/0279704 A1* | 9/2022 | Sharda ................. A01C 21/005 |
| 2023/0140374 A1 | 5/2023 | Conboy et al. |
| 2023/0189691 A1 | 6/2023 | Strnad et al. |

FOREIGN PATENT DOCUMENTS

| EP | 2420122 A1 | 2/2012 |
| EP | 3840561 | 6/2023 |
| EP | 4198887 | 6/2023 |
| WO | WO 2021021594 A1 | 2/2021 |

OTHER PUBLICATIONS

Extended European Search Report and Written Opinion issued in European Patent Application No. 24187948.5 dated Dec. 10, 1024, in 10 pages.
Extended European Search Report and Written Opinion issued in European Patent Application No. 23217218.9 dated Apr. 30, 2024, in 09 pages.

* cited by examiner

*Primary Examiner* — Peter D Nolan
*Assistant Examiner* — Jacob Kent Besteman-Street
(74) *Attorney, Agent, or Firm* — Christopher J. Volkmann; KELLY, HOLT & CHRISTENSON PLLC

(57) ABSTRACT

A timing signal is generated and indicates when an event will occur on a planting machine. A camera is controlled based on the timing signal.

17 Claims, 14 Drawing Sheets

CONTROLLING IMAGE CAPTURE BASED ON EVENT TIMING DURING PLANTING OPERATION

CROSS-REFERENCE TO RELATED APPLICATION

The present application is based on and claims the benefit of U.S. provisional patent application Ser. No. 63/476,298, filed Dec. 20, 2022, the content of which is hereby incorporated by reference in its entirety.

FIELD OF THE DESCRIPTION

The present description generally relates to planting equipment. More specifically, but not by limitation, the present description relates to a processing and control system for an agricultural planting machine that is configured to control an image capture device based on events taking place during operation of the planting equipment.

BACKGROUND

There are a wide variety of different types of agricultural seeding or planting machines. They can include row crop planters, or the like. These machines place seeds at a desired depth within a plurality of parallel seed trenches that are formed in the soil.

As one example, a row unit is often mounted to a planter with a plurality other row units. The planter is often towed by a tractor over soil where seed is planted in the soil, using the row units. The row units on the planter follow the ground profile while disk openers are driven into the ground to open a furrow and gauge wheels set the depth of penetration of the disk openers. The mechanisms that are used for moving the seed from the seed hopper to the ground often include a seed metering system and a seed delivery system.

The seed metering system receives the seeds in a bulk manner, and divides the seeds into smaller quantities (such as a single seed, or a small number of seeds—depending on the seed size and seed type) and delivers the metered seeds to the seed delivery system. There are different types of seed metering systems and, in one example, the seed metering system uses a rotating mechanism (which is normally a disc or a concave or bowl-shaped mechanism) that has seed receiving apertures that receive the seeds from a seed pool and move the seeds from the seed pool to the seed delivery system which delivers the seeds to the ground (or to a location below the surface of the ground, such as in a trench).

There are also different types of seed delivery systems that move the seed from the seed metering system to the ground. One seed delivery system is a gravity drop system that includes a seed tube that has an inlet position below the seed metering system. Metered seeds from the seed metering system drop into the seed tube and fall (via gravitational force) through the seed tube into the seed trench. Other types of seed delivery systems are assistive systems, in that they do not simply rely on gravity to move the seed from the metering mechanism into the ground. Instead, such systems actively capture the seeds from the seed meter and physically move the seeds from the meter to a lower opening, where the seeds exit into the ground or trench.

Row units can also be used to apply material to the field (e.g., fertilizer, herbicide, insecticide, or pesticide etc.) over which they are traveling. In some scenarios, each row unit has a valve that is coupled between a source of material to be applied, and an application assembly. As the valve is actuated, the material passes through the valve, from the source to the application assembly, and is applied to the field. In other scenarios, each row unit has a commodity tank and a commodity delivery system that delivers a commodity (such as fertilizer, herbicide, insecticide, pesticide, etc.) to the soil.

Some planting machines are operated in sections. For example, the row units are grouped into different sections. The row units in each of the different sections can be controlled together as a group, and each section can be controlled separately from other sections.

The discussion above is merely provided for general background information and is not intended to be used as an aid in determining the scope of the claimed subject matter.

SUMMARY

A timing signal is generated and indicates when an event will occur on a planting machine. An image capture device is controlled based on the timing signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, many current systems plant seeds in furrows opened by a furrow opener. The rate at which seeds are placed in the furrow (the seed rate) depends on the desired seed population and the speed of the planting machine. The seed rate can be quite high, such as forty (40) seeds per second for corn or one hundred twenty (120) seeds per second for soybeans, as but two examples. Similarly, some current systems controllably apply fertilizer (or other material) as desired (such as intermittently or otherwise). For instance, the system may apply material on the seeds, between the seeds, to the side of the seeds, etc.

Also, in some current systems, an image capture device (such as a camera) is mounted to the planting machine to capture images based on one or more events. For instance, the image capture device may capture images of the furrow with seeds in the furrow. The image capture device may capture images of chemical application events, etc.

These events (planting seed, applying chemical, etc.) often happen so quickly that the image capture device is unable to take images at a high enough frequency to capture all of the events, unless a high frequency image capture device is used (such as a camera with a high shutter speed). These high frequency image capture devices can be very costly and fragile. When using a lower speed image capture device, images are often taken at times so the images do not contain useful information. For example, instead of capturing images of seeds in the furrow, the captured images may be images of the furrow between seeds. Further, instead of capturing images showing material application, the captured images may be images captured before or after chemical is applied. These are only examples and images may be other images that do not capture useful information. These images result in wasted computing and memory resources used in processing and storing unhelpful images, and can reduce performance.

The present system thus generates an event timing signal indicative of when an event will occur (such as when a seeding operation will place a seed in the furrow, when a material application operation will apply material, when a section control operation will be performed, etc.). An image capture control signal is timed, based on the timing signal, so the image capture device is actuated at a time when the captured image will include useful information (such as an image that shows seed-to-soil contact, an image that shows the location of chemical application relative to the seed, etc.). The captured image can then be processed for further operation.

Figure 1:
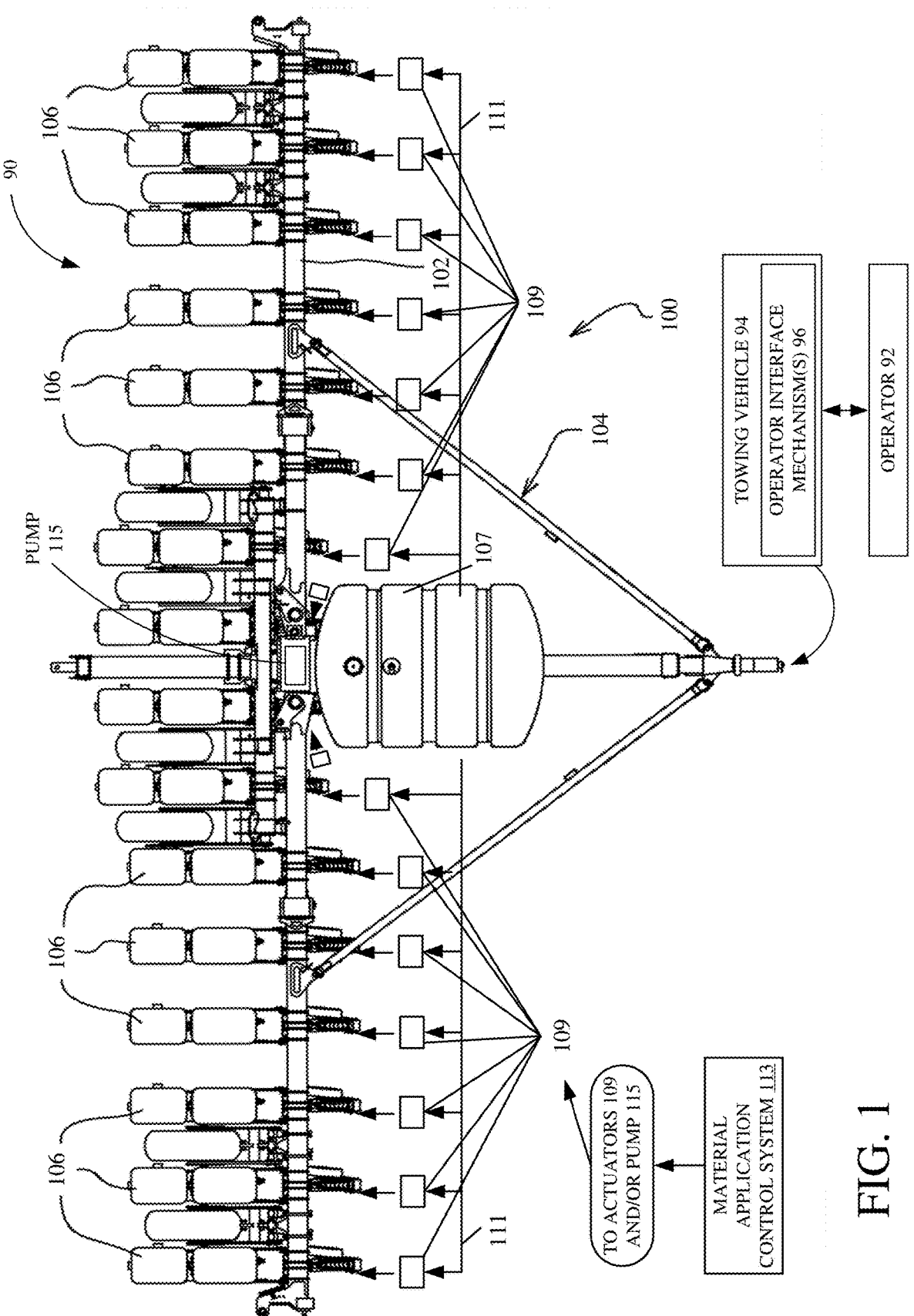
FIG. 1 shows one example of a top view of an agricultural machine.

FIG. 1 is a partial pictorial, partial schematic top view of one example of an architecture 90 that includes agricultural planting machine 100, towing vehicle 94, that may be operated by operator 92, and material application control system 113, which can be located on one or more individual parts of machine 100 (such as on each row unit, or set of row units), centrally located on machine 100, distributed about the architecture 90, or on towing vehicle 94. Operator 92 can illustratively interact with operator interface mechanisms 96 to manipulate and control vehicle 94, system 113, and some or all portions of machine 100.

Machine 100 is a row crop planting machine that illustratively includes a toolbar 102 that is part of a frame 104. FIG. 1 also shows that a plurality of planting row units 106 are mounted to the toolbar 102. Machine 100 can be towed behind towing vehicle 94, such as a tractor. FIG. 1 shows that material can be stored in a tank 107 and pumped through a supply line 111 so the material can be dispensed in or near the rows being planted. In one example, a set of devices (e.g., actuators) 109 is provided to perform this operation. For instance, actuators 109 can be individual pumps that service individual row units 106 and that pump material from tank 107 through supply line 111 so the material can be dispensed on the field. In such an example, material application control system 113 controls the pumps. In another example, actuators 109 are valves and one or more pumps 115 pump the material from tank 107 to valves 109 through supply line 111. In such an example, material application control system 113 controls valves 109 by generating valve or actuator control signals. The control signal for each valve or actuator can, in one example, be a pulse width modulated control signal. The flow rate through the corresponding valve 109 can be based on the duty cycle of the control signal (which controls the amount of time the valve is open and closed). The flow rate can be based on multiple duty cycles of multiple valves or based on other criteria. Further, the material can be applied in varying rates. For example, fertilizer may be applied at one rate when it is being applied at a location where it will be spaced from a seed location and at a second, higher, rate when it is being applied at a location closer to the seed location. The valves can be incorporated into or otherwise used with the nozzles. The nozzles may be controllable to aim or shape the spray of material being applied. The valves can also be controlled in a way other than using pulse width modulation. These are examples only.

In addition, each row unit 106 can have a commodity tank that stores material to be applied. A commodity delivery system (as is discussed in greater detail below) can have a motor that drives a commodity meter that dispenses an amount of the material. The motor can be controlled by material application control system 113 to dispense the material at desired locations relative to seeds or in another desired way.

Figure 2:
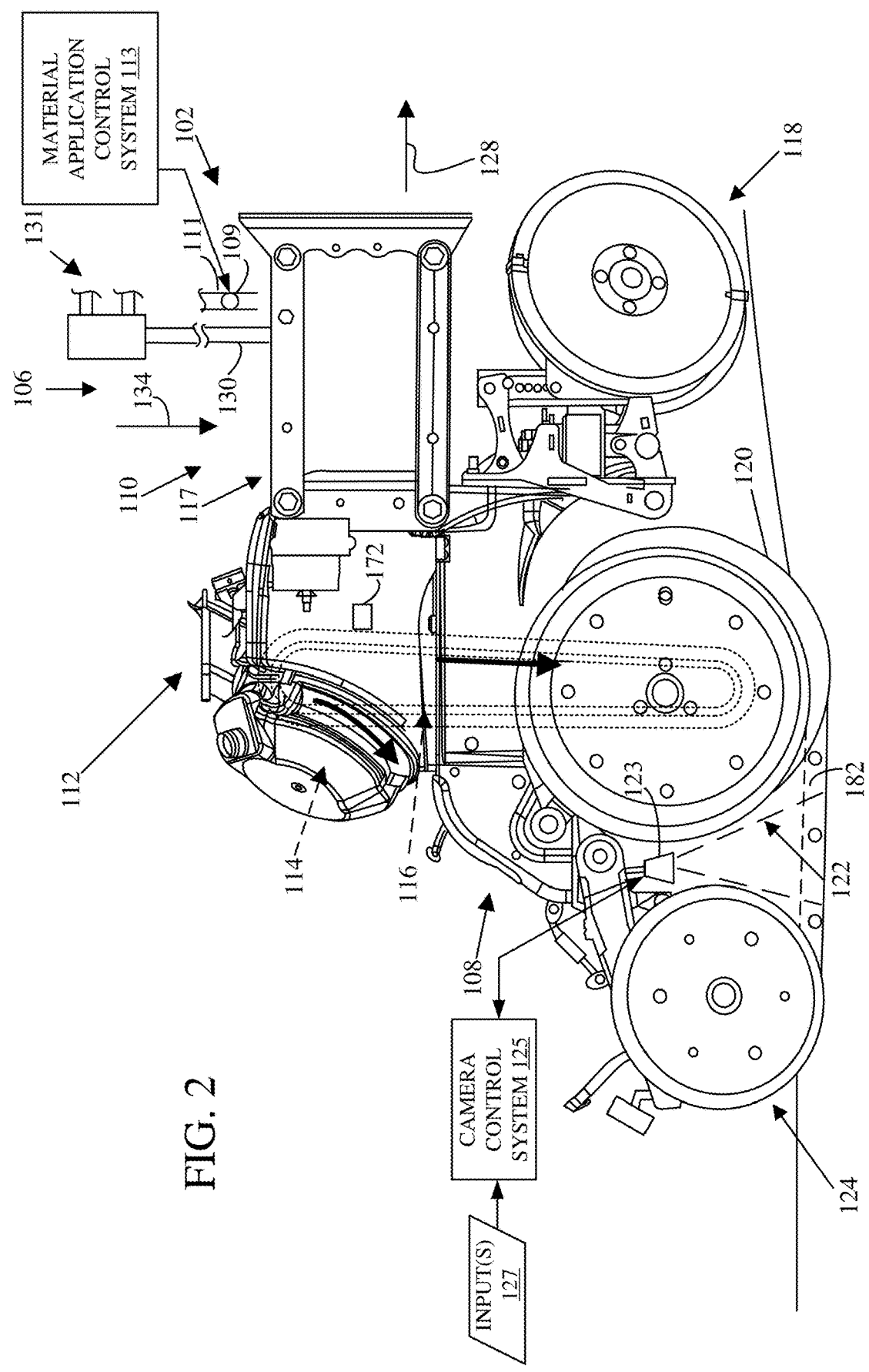
FIG. 2 shows one example of a side view of a row unit of the agricultural machine shown in FIG. 1.

FIG. 2 is a side view showing one example of a row unit 106 in more detail. FIG. shows that each row unit 106 illustratively has a frame 108. Frame 108 is illustratively connected to toolbar 102 by a linkage shown generally at 110. Linkage 110 is illustratively mounted to toolbar 102 so that linkage 110 can move upwardly and downwardly (relative to toolbar 102). Row unit 106 also illustratively has a seed hopper 112 that stores seed. The seed is provided from hopper 112 to a seed metering system 114 that meters the seed and provides the metered seed to a seed delivery system 116 that delivers the seed from the seed metering system 114 to the furrow or trench 182 generated by furrow opener 120 on the row unit 106. In one example, seed metering system 114 uses a rotatable member, such as a disc or concave-shaped rotating member, and an air pressure differential to retain seed on the disc and move it from a seed pool of seeds (provided from hopper 112) to the seed delivery system 116. Other types of meters can be used as well.

Row unit 106 can also include a row cleaner 118, ahead of furrow opener 120, a set of gauge wheels 122, and a set of closing wheels 124. Row unit 106 can also include an additional hopper that can be used to provide additional material, such as a fertilizer or another chemical.

FIG. 2 also shows that row unit 106 has an image capture device (e.g., camera) 123. A camera control system 125 receives sensor inputs and other inputs 127 and controls the actuation of device 123. In one example, inputs 127 can be used to determine when to actuate the shutter on device 123 to capture an image that contains information of interest. In another example, where device 123 has a variable shutter speed, the inputs 127 can be used by system 125 to control the shutter speed of device 123. For example, the inputs 127 may include a timing signal indicating when a seed will be placed in furrow 152 or indicating when material will be applied to the furrow. System 125 can synchronize the control of image capture device 123 with the timing signal so images are captured at the desired time to obtain useful information.

In the example shown in FIG. 2, liquid material is passed, e.g., pumped or otherwise forced, through supply line 111 to an inlet end of actuator 109. Actuator 109 is controlled by control system 113 to allow the liquid to pass from the inlet end of actuator 109 to an outlet end.

As liquid passes through actuator 109, the liquid travels through an application assembly 117 from a proximal end (which is attached to an outlet end of actuator 109) to a distal tip (or application tip) 119, where the liquid is discharged into a trench 182, or proximate a trench or furrow 182. The timing signal received by camera control system 125 may be indicative of when material will be applied in the furrow. Device 123 can then be controlled to capture useful information about the material application operation as well.

In operation, as row unit 106 moves in the direction generally indicated by arrow 128, opener 120 opens a furrow 182 at a depth set by gauge wheel 122. Material application control system 113 generates a control signal to actuate valve 109 to apply material (such as fertilizer) to the furrow at desired locations, or intervals in furrow 182. Row cleaner 118 generally cleans the row ahead of the opener 120 to remove plant debris from the previous growing season prior to the opener 120 opening furrow 182 in the soil. Seed is metered by seed metering system 114 and delivered to the furrow by seed delivery system 116. Seeds can be sensed by seed sensor 172, as the seeds move through seed delivery system 116. Some examples of seed sensor 172 may include an optical or reflective sensor, which includes a radiation transmitter component and a receiver component. The transmitter component emits electro-magnetic radiation and the receiver component then detects the radiation and generates a signal indicative of the presence or absence of a seed adjacent the sensors. In another example, row unit 106 may be provided with a seed firmer that is positioned to travel through the furrow 182 after seeds are placed in furrow 182 and before the furrow 182 is closed to firm the seeds in place. A seed sensor can be placed on the seed firmer and generate a sensor signal indicative of a seed. Some examples of other seed sensors are described in greater detail below. The position of each seed (and/or when the seed is placed in the furrow) can be controlled based on the seed sensor signal from the seed sensor and/or based on the position of fertilizer, or the timing of application of fertilizer, as is described elsewhere herein. Closing wheels 124 close the furrow 182 over the seed. A downforce generator 131 can also be provided to controllably exert downforce to keep the row unit 106 in desired engagement with the soil.

Figure 3:
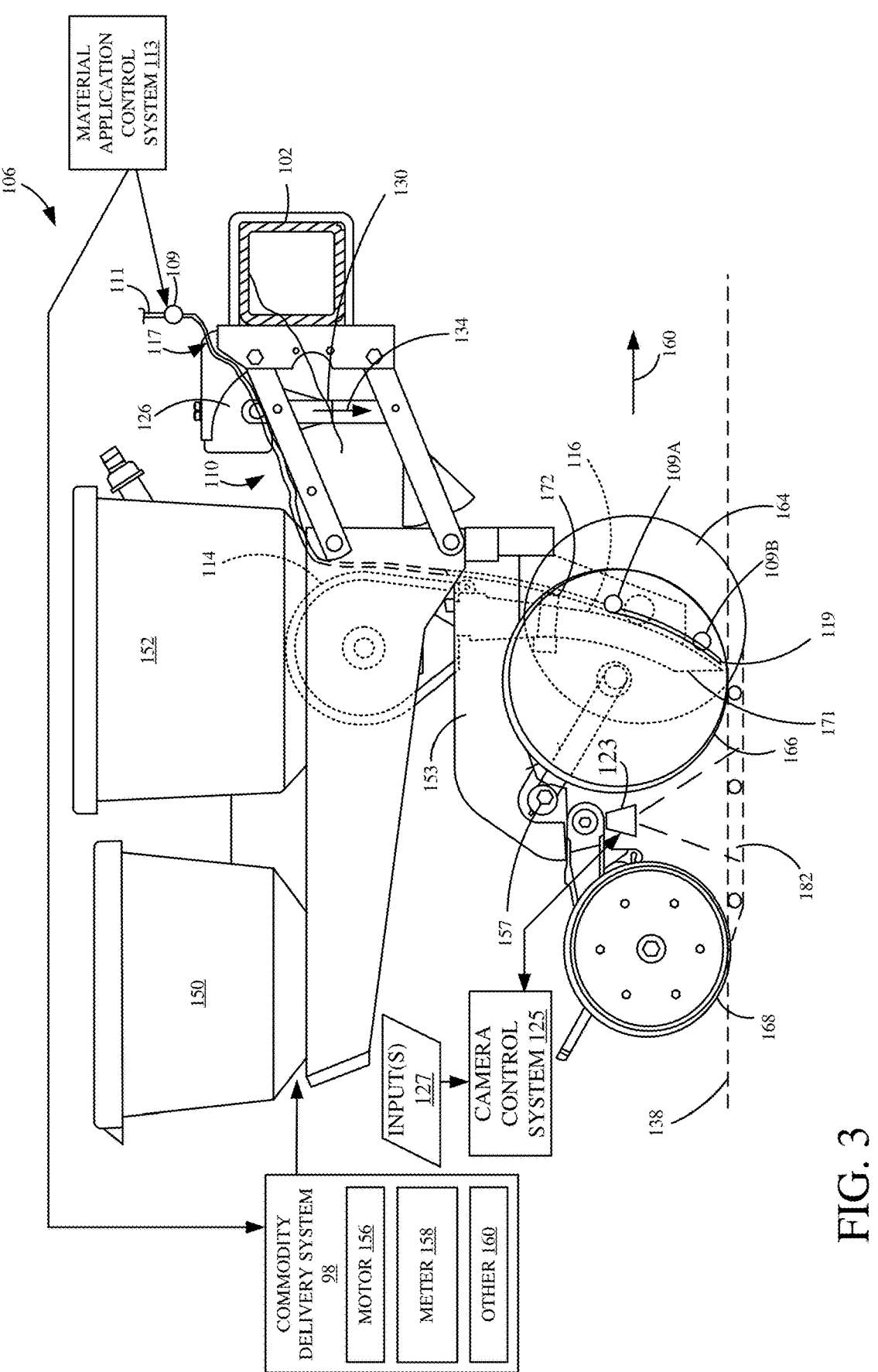
FIG. 3 shows an example of a side view of a row unit of the agricultural machine shown in FIG. 1.

FIG. 3 is a side view of another example of a row unit 106, with actuator 109, and system 113 shown as well. Actuator 109 is shown in three possible locations labeled as 109, 109A, and 109B. Row unit 106 illustratively includes a chemical tank (also referred to herein as a commodity tank) 150, a seed storage tank 152, and commodity delivery system 98 (which, itself, can include a motor 156, a commodity meter 158, and other items 160). Row unit 106 also illustratively includes one or more disc openers 164, a set of gauge wheels 166, and a set of closing 16 wheels 168 as well as an image capture device 123 and camera control system 125. Seeds from tank 152 are fed into a seed meter 114 (e.g., by gravity or from a centralized commodity distribution system that uses pneumatic commodity distribution to each row unit). The seed meter controls the rate at which seeds are dropped into a seed delivery system 116 which, in the example in FIG. 2, is a seed tube, but could be another seed delivery system, such as a brush belt or flighted belt from seed storage tank 152. The seeds can be sensed as they move through seed tube 116 by a seed sensor 172.

In the example shown in FIG. 3, liquid material is passed, e.g., pumped or otherwise forced, through supply line 111 to an inlet end of actuator 109. Actuator 109 is controlled by control system 113 to allow the liquid to pass from the inlet end of actuator 109 to an outlet end.

As liquid passes through actuator 109, the liquid travels through an application assembly 117 from a proximal end (which is attached to an outlet end of actuator 109) to a distal tip (or application tip) 119, where the liquid is discharged into a trench 182, or proximate a trench or furrow 182, opened by disc opener 164.

Material application control system 113 can generate control signals to control motor 156 to drive commodity meter 158. Meter 158, when driven by motor 156, meters out a desired amount of commodity from tank 150. In operation, row unit 106 shown in FIG. 3 travels generally in the direction indicated by arrow 160. The double disc opener 164 opens the furrow in the soil, and the depth of the furrow 182 is set by gauge wheels 166. Seeds are dropped through seed tube 116, into the furrow 182, and closing wheels 168 close the furrow 182, e.g., push soil back into the furrow 182.

Some parts of the different examples of row units 106 shown in FIGS. 2 and 3 will now be discussed in more detail. First, it will be noted that there are different types of seed meters 114, and the one that is shown is shown for the sake of example only and is described in greater detail elsewhere herein. However, in one example, each row unit 106 need not have its own seed meter. Instead, metering or other singulation or seed dividing techniques can be performed at a central location, for groups of row units 106. The metering systems can include finger pick-up discs and/or vacuum meters (e.g., having rotatable discs, rotatable concave or bowl-shaped devices), among others. The seed delivery system 116 can be a gravity drop system (such as the seed tube shown in FIG. 3) in which seeds are dropped through the seed tube and fall (via gravitational force) through the seed tube and out the outlet end 171 into the seed trench 182. Other types of seed delivery systems 116 may be or may include assistive systems, in that the assistive systems do not simply rely on gravity to move the seed from the metering system into the ground. Instead, such assistive systems actively assist the seeds in moving from the meter to a lower opening, where they exit or are deposited into the ground or trench. These can be systems that physically capture the seed and move it from the meter to the outlet end of the seed delivery system or they can be pneumatic systems that pump air through the seed tube to assist movement of the seed. The air velocity can be controlled to control the speed at which the seed moves through the delivery system. Some examples of assistive systems are described in greater detail below with respect to FIGS. 5 and 6.

The downforce actuator or generator 131, 126 is mounted on a coupling assembly or linkage 110 that couples row unit 106 to toolbar 102. Actuator 131, 126 can be a hydraulic actuator, a pneumatic actuator, a spring-based mechanical actuator or a wide variety of other actuators. In the example shown in FIGS. 2 and 3, a rod 130 is coupled to a parallel linkage 110 and is used to exert an additional downforce (in the direction indicated by arrow 134) on row unit 106.

In order to determine when to actuate image capture device 123, camera control system 125 can take into account when and where a seed is placed in the furrow, when and where material is applied, etc. For instance, when seed sensor 172 generates an output indicating that a seed is sensed in seed delivery system 116 then the rate at which the seed moves through seed delivery system 116 the speed of row unit 106, the location of the output of seed delivery system 116, among other things, can be used to determine when an image should be captured by image capture device 125. Also, the latency in device 123, itself, can be considered so that when device is actuated, the image captures the seed or other item(s) of interest. Also, in one example, the speed of seed delivery system 116 may be controllably varied. This variable control can also be considered in determining when the seed will be placed in furrow and hence when to actuate image capture device 123.

Similarly, if the image is to capture material applied to the furrow, then the time when the material is applied (given the latency in the actuator 109 or pump 115, the material characteristics—such as viscosity, pressure, as discussed below, etc.) and the location in the furrow where the material ends up can also be considered in determining when to actuate image capture device 123.

The location of the fertilizer or other material may be determined by material application control system 113. Material application control system 113 illustratively is programmed with, or detects a distance, e.g., a longitudinal distance, that the distal tip 119 is from the exit end 171 of seed tube 170 or seed delivery system 116. System 113 also illustratively senses, or is provided (e.g., by another component, such as a GPS unit or a tractor, etc.), the ground speed of row unit 106. As the row units 106 on an implement being towed by a prime mover (e.g., a tractor) may move faster or slower than the tractor during turns, particularly as the width of the implement increases, the material application control system 113 may sense or be provided the ground speed of each row unit 106 of the implement. By way of example, the material application control system 113 may sense or be provided information when the implement is turning right indicating that the rightmost row unit 106 is travelling slower, i.e., has a lower ground speed, than the leftmost row unit 106. Further, the material application control system 113 detects, is provided, or is programmed with, system data indicating the responsiveness of actuator 109 and/or motor 156 and commodity meter 158, under certain conditions (such as under certain temperature conditions, certain humidity conditions, certain elevations, when spraying a certain type of fluid, etc.) and system 113 also detects, is provided, or programmed with one or more properties of the material being applied through actuator 109 and commodity delivery system 98 (as this may affect the speed at which actuator 109 and/or system 154 responds, the time it takes for the material to travel through application assembly 117 to the distal tip 119 or delivered by system 98 and be applied to furrow 182, etc.). Further, material application control system 113 illustratively detects (or is provided with a sensor signal indicative of) the forward speed of row unit 106 in the direction generally indicated by arrow 160.

With this type of information, once system 113 receives a signal indicating that fertilizer or other material is dispensed, system 113 then determines the location where, and/or time when, the material will exit through tip 119 into the furrow. By way of example, it may be that some material is to be applied in discontinuous strips in the furrow, of a given (the strips having a pre-set, default, or selected) length. In that case, system 113 times the actuation of actuator so that the applied material will be applied as strips of the given length. Further, actuator 109 can be actuated to dispense material at a varying rate. System 113 can control actuator 109 to dispense more material at a first set of locations and less at other locations spaced from the first set of locations or according to other patterns. The seeds can then be placed at desired locations relative to such patterns of material placement. All of this information can be considered in determining when to actuate image capture device 123 to obtain a desired image.

It will be noted that a wide variety of different configurations are contemplated herein. For instance, in one example, FIG. 3 shows that actuator 109 may be placed closer to the distal tip 119 (such as indicated by actuator locations 109A and 109B). In this way, there is less uncertainty as to how long it will take the material to travel from the actuator 109A and 109B to the distal tip 119. In yet another example, the valve or actuator 109 is disposed at a different location. All of these and other configurations are contemplated herein.

Figure 4:
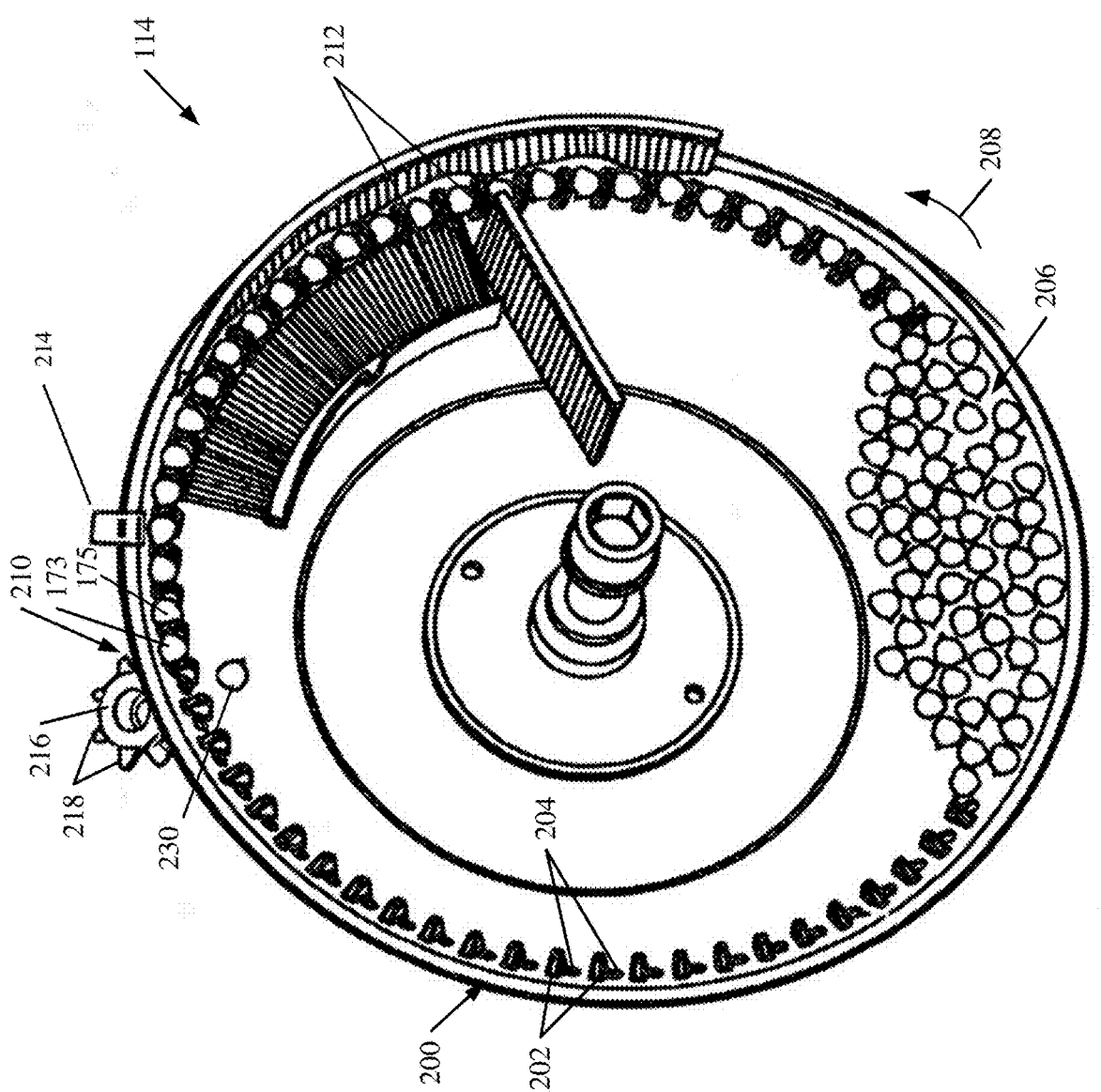
FIG. 4 is a perspective view of a portion of a seed metering system.

FIG. 4 shows one example of a rotatable mechanism that can be used as part of the seed metering system 114. The seed metering system 114 includes a rotatable element 200, such as a disc or concave element. Rotatable element 200 has a cover (not shown) and is rotatably mounted relative to the frame of the row unit 106. Rotatable element 200 is driven by a motor and has a plurality of projections or tabs 202 that are closely proximate corresponding apertures 204. A seed pool 206 is disposed generally in a lower portion of an enclosure formed by rotatable element 200 and its corresponding cover. Rotatable element 200 is rotatably driven by a motor (such as an electric motor, a pneumatic motor, a hydraulic motor, etc.) for rotation generally in the direction indicated by arrow 208, about a hub. A pressure differential is introduced into the interior of the metering system so that the pressure differential influences seeds from seed pool 206 to be drawn to apertures 204. For instance, a vacuum can be applied to draw the seeds from seed pool 206 so that they come to rest in apertures 204, where the vacuum holds them in place. Alternatively, a positive pressure can be introduced into the interior of the metering system to create a pressure differential across apertures 204 to perform the same function.

Once a seed comes to rest in (or proximate) an aperture 204, the vacuum or positive pressure differential acts to hold the seed within the aperture 204 such that the seed is carried upwardly generally in the direction indicated by arrow 208, from seed pool 206, to a seed discharge area 210. It may happen that multiple seeds are residing in an individual seed cell. In that case, a set of brushes or other members 212 that are located closely adjacent the rotating seed cells tend to remove the multiple seeds so that only a single seed is carried by each individual cell. Additionally, a seed sensor 214 can also be mounted adjacent to rotatable element 200.

Once the seeds reach the seed discharge area 210, the vacuum or other pressure differential is illustratively removed, and a positive seed removal wheel or knock-out wheel 216, can act to remove the seed from the seed cell. Wheel 216 illustratively has a set of projections 218 that protrude at least partially into apertures 204 to actively dislodge the seed from those apertures. When the seed is dislodged, it is illustratively moved by the seed delivery system 116 (one example of which is seed tube and two other examples of which are shown below in FIGS. 5 and 6) to the furrow in the ground. FIG. 4 shows seeds 173 and 175 approaching knock-out wheel 216 and seed 230 after being removed from aperture 204 by one of the projections 218 on knock-out wheel 216.

It will be noted that the motor that drives rotation of meter rotatable element 200 or rotatable element 200, itself, can be arranged relative to a seed meter sensor that generates a sensor signal indicative of the angular position and/or speed of the motor, or the rotatable element 200, or another item from which the angular position and/or speed of rotatable element 200, can be derived. As described below, the angular position of rotatable element 200, along with the signal from seed sensor 214 and the speed of rotation of meter 114 can be used to determine the position of the seed as it moves through the seeding system and into the ground. This can be used to control the dispensing of seeds at precise field locations and to control actuation of the image capture device 123.

In one example, the seed meter sensor comprises a rotary encoder or angle encoder that senses an angular position of a portion of seed metering system 114 or of the motor driving seed metering system 114. For instance, a rotary encoder can be mounted inside the motor driving the meter shaft, or can be external to the motor and configured to sense the meter shaft. A locating feature (such as a keyed interface) can be utilized in mounting the seed meter disc to the shaft, such that the position of the seed cells relative to the motor shaft position is pre-defined or known. Examples of the seed meter sensor include tooth encoders, Hall Effect sensors, and the like.

In another example, an optical sensor is utilized. For instance, one or more optical sensors can be positioned relative to slot(s) formed in the seed meter. As the disc rotates, the optical 11 sensors detect the slots (e.g., an optical sensor detects light passing through a slot) as they pass by the optical sensor.

In another example, the seed meter sensor can be a proximity sensor configured to measure seed cells directly, or other features of rotatable element 200.

Figure 5:
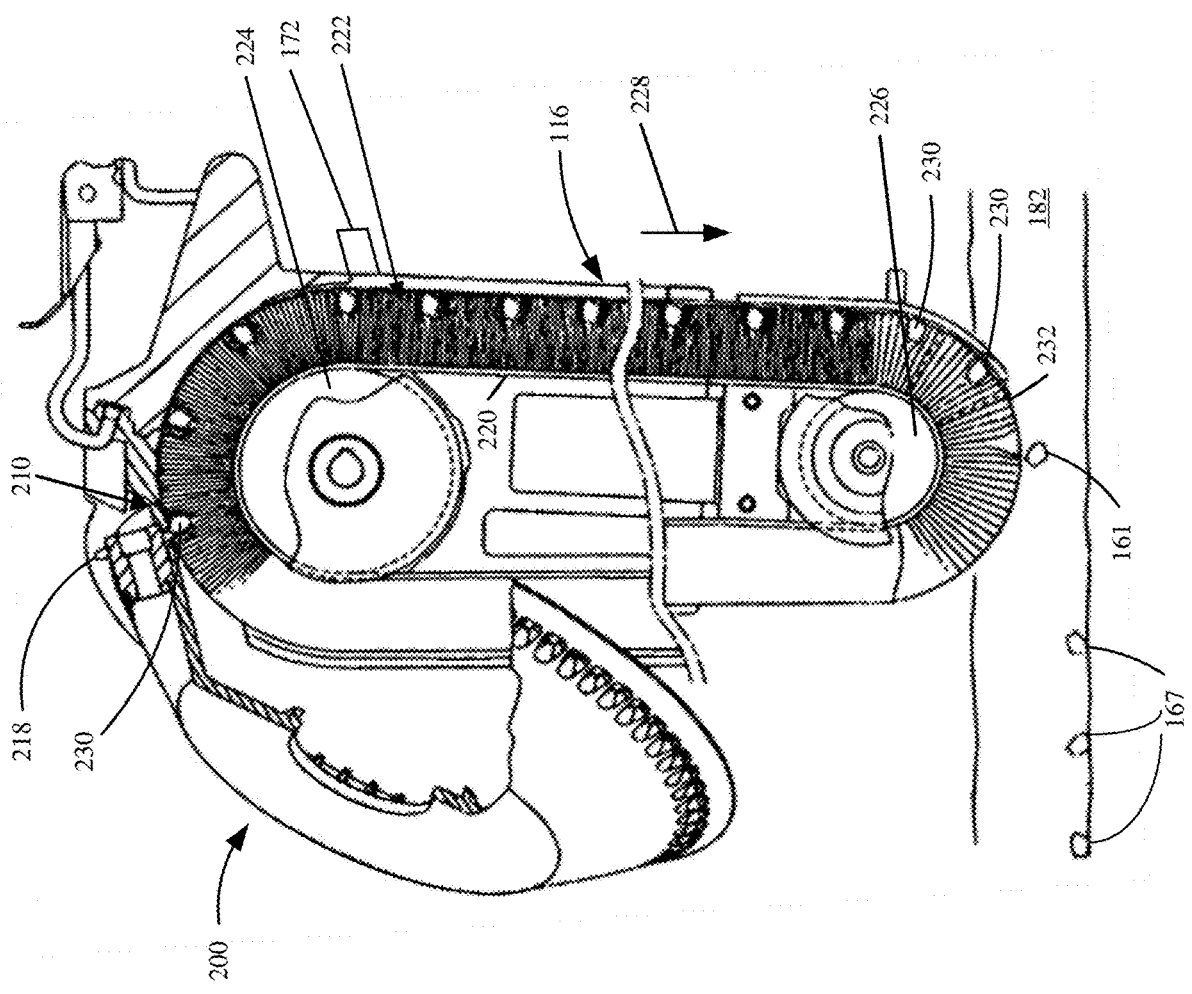
FIGS. 5 and 6 show two examples of different seed delivery systems that can be used with a seed metering system.

FIG. 5 shows an example where the rotating element 200 is positioned so that its seed discharge area 210 is above, and closely proximate, seed delivery system 116 which includes an assistive seed delivery or transport mechanism. In the example shown in FIG. 5, the seed transport mechanism includes a belt 220 (or other continuous member) with a brush that is formed of distally extending bristles 222 attached to belt 220. Belt 220 is mounted about pulleys 224 and 226. One of pulleys 224 and 226 is illustratively a drive pulley while the other is an idler pulley. The drive pulley is illustratively rotatably driven by a conveyance motor which can be an electric motor, a pneumatic motor, a hydraulic motor, etc. Belt 220 is driven generally in the direction indicated by arrow 228.

Therefore, when seeds 230 are moved by rotating element 200 to the seed discharge area 210, where they are discharged from the seed cells in rotating element 200, they are illustratively positioned within the bristles (e.g., in a receiver) 222 by the projections 202 following each aperture 204 and the projections 218 on knock-out wheel 216 that push the seed into the bristles 222. Seed delivery system 116 illustratively includes walls that form an enclosure around the bristles 222, so that, as the bristles 222 move in the direction indicated by arrow 228, the seeds 230 are carried along with the bristles 222 from the seed discharge area 210 of the metering mechanism, to a discharge area 232 where the seeds are discharged either at ground level, or below ground level within a trench or furrow 182 that is generated by the furrow opener 120, 164 on the row unit 106. Seed 161 is shown after being discharged from discharge area 232, and seeds 167 are shown after coming to rest in furrow 182.

Additionally, seed sensor 172 is also illustratively coupled to seed delivery system 116. As the seeds are moved within bristles 222, sensor 172 can detect the presence or absence of a seed. It should also be noted that while the present description will proceed as having sensors 172 and 214, it is expressly contemplated that, in another example, only one sensor is used. Additional or different sensors can also be used.

Figure 6:
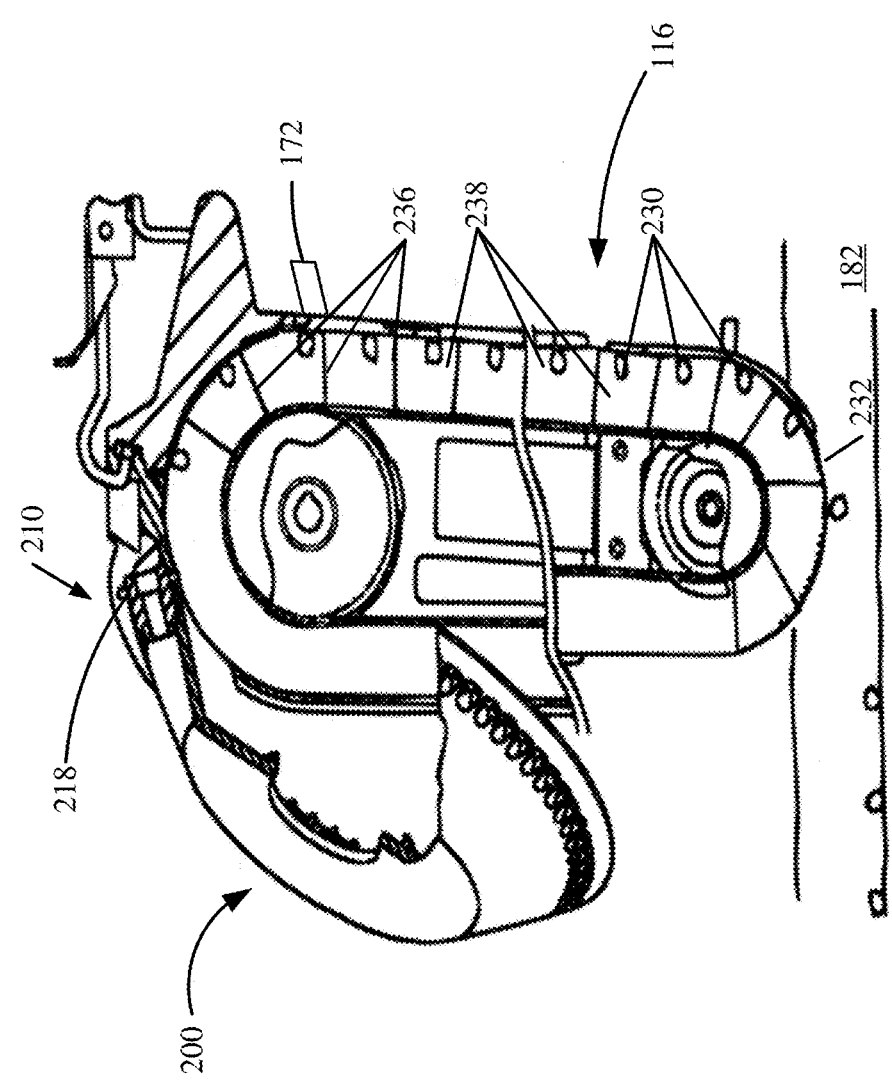

FIG. 6 is similar to FIG. 5, except that seed delivery system 116 is not formed by a belt 220 with distally extending bristles 222. Instead, the transport mechanism includes a belt in which a set of paddles 236 form individual chambers (or receivers) 238, into which the seeds 230 are dropped from the seed discharge area 210 of the metering mechanism. The belt moves the seeds 230 from the seed discharge area 210 to the discharge area 232 within the trench or furrow 182.

There are a wide variety of other types of delivery systems as well, that include a transport mechanism and a receiver that receives a seed. For instance, the delivery system can include dual belt delivery systems in which opposing belts receive, hold, and move seeds to the furrow 182, a rotatable wheel that has sprockets which catch seeds from the metering system and move them to the furrow 182, multiple transport wheels that operate to transport the seed to the furrow 182, an auger, among others. The present description will proceed with respect to a brush belt, but many other delivery systems are contemplated herein as well.

As mentioned above, for a variety of reasons, it may be desirable to obtain an image of the furrow with seeds therein to show things such as seed-to-soil contact, seed orientation, furrow quality where the seed is located, application of material at a desired location relative to the seed, or for other reasons. Similarly, it may be desirable to capture an image of the furrow between seeds for various reasons, such as to verify material application at locations between seeds. However, image capture device 123 may not be sufficiently high seed to capture each of these events (e.g., an image of each seed, or an image of the spaces between each seed, etc.). If image capture device 123 is actuated indiscriminately, it often captures images that do not contain meaningful information. For instance, if the images are to be used to verify or analyze seed-to-soil contact but the actuation of image capture device 123 is not adequately controlled, then many of the images will not even show a seed but may show the furrow between seeds. This is a waste of computing system resources (in processing and storing such images) and electronic resources (in actuating the image capture device, etc.).

Therefore, the present description includes a camera control system 125. System 125 receives signals indicative of the event to be captured by image capture device 123 and determines when to actuate device 123 so it captures the desired image. For instance, system 125 may receive a timing signal that is generated based on the output from seed sensor 172 and actuable image capture device 123 based on the timing signal. As an example, system 125 can synchronize the control of image capture device 123 with the timing signal to ensure that device 123 captures an image of the furrow 182 at a location that contains a seed. Though device 123 may not be fast enough to capture an image of every seed, device 123 can be controlled so the images it does capture substantially all contain a seed. This reduces computational inefficiencies and increases the accuracy and utility of the captured images and any processes or systems controlled based on those images.

Figure 7:
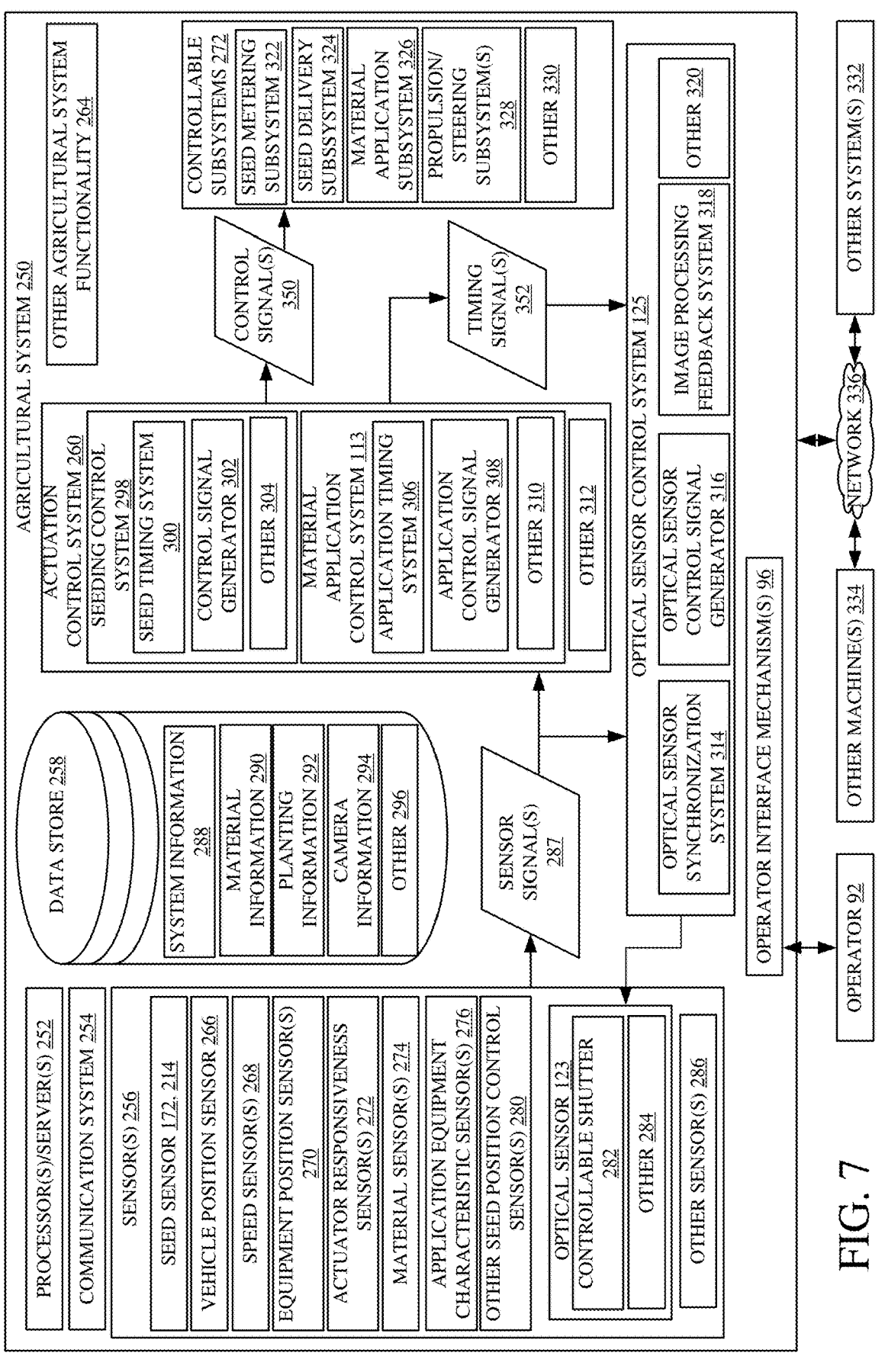
FIG. 7 is a block diagram of one example of an agricultural machine architecture (or agricultural system).

FIG. 7 is a block diagram of one example of an agricultural system 250. System 250 can include items from previous figures, and those items are similarly numbered. Also, the items in agricultural system 250 can by located on the planting machine 100, the towing vehicle 94, or elsewhere. Similarly, the items in agricultural system 250 can be dispersed so that some items are disposed on machine 100 while other items are disposed on towing vehicle 100, or elsewhere.

In the example shown in FIG. 7, agricultural system 250 includes processors or servers 252, communication system 254, sensors 256, data store 258, actuation control system 260, optical sensor control system 125, operator interface mechanisms 96, controllable subsystems 262, and other agricultural system functionality 264.

Sensors 256 can include one or more seed sensors 172 vehicle position sensor 266, speed sensor 268, equipment position sensor(s) 270, actuator responsiveness sensors 272, material sensor(s) 274, application equipment characteristic sensor(s) 276, other seed position control sensor(s) 278, other material application control sensor(s) 280, optical sensor 123 (which is shown having a controllable shutter 282 and other optical sensor functionality 284), as well as other sensors 286. Data store 258 can store system information 288, material information 290, planting information 292, camera (or other optical sensor) information 294, and other items 296. Actuation control system 260 includes seeding control system 298 (which, itself, includes seed timing system 300, seeding signal generator 302, and other items 304), material application control system 113 (which, itself, includes application timing system 306, application control signal generator 308, and other items 310), as well as other items 312. Optical sensor control system 125 includes optical sensor synchronization system 314, optical sensor control signal generator 316, image processing feedback system 318, and other items 320. Controllable subsystems 262 include seed metering subsystem 322, seed delivery subsystem 324, material application subsystem 326, propulsion/steering subsystems 328, and other subsystems 330.

FIG. 7 also shows that agricultural system 250 can be connected to other systems 332 and other machines 334 through a network 336. Therefore, network 336 can be a wide area network, a local area network, a near field communication network, a cellular communication network, a Bluetooth network, a Wi-Fi network, or any of a wide variety of other networks or combinations of networks. Other systems 332 can include farm manager systems, manufacturer systems, vendor systems, service organization systems, etc. Other machines 334 can include other machines operating in the same field, tender vehicles, or any of a wide variety of other machines.

Before describing the operation of agricultural system 250 in more detail, a description of some of the items in agricultural system 250, and their operation, will first be described. Communication system 254 enables communication of the items in agricultural system with one another, and also communication over network 336. Therefore, communication system 254 can include a controller area network (CAN) bus and bus controller, as well as other communication system functionality to enable communication over network 336, depending upon the type of network 336.

Seed sensor 172, 214 can be those described above or other seed sensors, located elsewhere on the planting machine 100 in order to sense seeds. Vehicle position sensor 266 can be a global navigation satellite system (GNSS) receiver, a dead reckoning system, a cellular triangulation system, or any of wide variety of other sensors that generate an output indicative of the position of agricultural system 250 in a local or global coordinate system. Equipment position sensors 270 can detect the position of the various items of equipment that are described elsewhere herein. For instance, sensors 276 can sense the position of the continuous member in seed delivery system 116, the position of the rotary member in metering system 114 the position of valve 109, and other equipment. Sensors 270 can provide an output indicative of the sensed position of the equipment. Actuator responsiveness sensors 272 sense a variable indicative of the responsiveness or latency of one or more different actuators in agricultural system 250. Material sensors 274 can sense different characteristics of the material that may bear on the timing of application of the material. For instance, sensors 274 can include a material viscosity sensor or a material density sensor, a material temperature sensor, an ambient temperature sensor, or any of a wide variety of other characteristics of the material being applied. Application equipment characteristic sensors can detect characteristics of the application equipment, such as the responsiveness of valve 109 or the pumps 115, or the responsiveness or settings of nozzles through which the material is passing. Sensors 276 can sense material pressure on either side of valve 109 or across the valves 109, or include other sensors. Other seed position control sensors 278 can include other sensors that provide a sensor signal indicative of a characteristic or parameter that can be used in controlling the planting equipment or seeding equipment, and/or in controlling optical sensor 123. For instance, the sensor signals from seed position control sensors can be used to control seed metering subsystems 322, seed delivery subsystem 234, or other controllable subsystems. The material application control sensors 280 can be other sensors that provide a sensor signal indicative of a characteristic or parameter that can be used in controlling the material application subsystem 326 or other controllable subsystems 262, and/or in controlling optical sensor 123.

Optical sensor 123 can be a mono camera or a stereo camera, or any of a wide variety of other optical sensors that capture an image (static or video). Optical sensor 123 can include a controllable shutter 282 that can be actuated to capture an image. In an example in which optical sensor 123 has a controllable shutter speed, control system 125 can generate control signals for control that can be controlled to modify the shutter speed of optical sensor 123.

System information 288 can include machine dimensions, the location of various items relative to one another on the machines, actuator responsiveness of actuators in system 250, system settings, or any of a wide variety of other system information 288. Material information 290 can include information about the material that is being applied, such as the material density, the material viscosity, how the density or viscosity changes with respect to temperature, material weight, or any of a wide variety of other material information. Planting information 292 can include the type of seeds being planted, the desired population, desired seed orientation, or any of a wide variety of other planting information 292. Camera information 294 can include information about optical sensor 123, such as shutter speed, camera responsiveness (the latency between when the camera shutter is actuated and when the image is captured), the location of optical sensor 123 relative to other items in agricultural system 250, or any of a wide variety of other camera information.

Sensors 256 provide sensor signals 287 that are responsive to the characteristics, parameters, or other variables being sensed by sensors 256. The sensor signals 287 may be indicative of the sensed variable or derived from the sensed variable. The sensor signals 287 can take different forms depending on the particular sensor 256 that generates them. Sensor signals 287 can be output or generated in other ways as well.

Seeding control system 298 can receive sensor signals 287, and other information, and generate control signals 350 to control seed metering subsystem 322 and/or seed delivery subsystem 324. Seed timing system 300 can detect the sensor signals 287 from seed sensors 268 which indicate when seeds are sensed. Seed timing system 300 can generate an output indicative of when seeds are to be output from seed delivery subsystem 324 and/or seed metering subsystem to obtain a desired seeding population, given the speed of machine 100, given the speed of the seed meter 114 and/or seed delivery system 116, etc. Seeding control signal generator 302 can generate control signals 350 for controlling the seed metering subsystem 322 and/or the seed delivery subsystem 324 to output seeds into the furrow 182 at the desired frequency, to obtain the desired seed population at a desired location, etc. Seeding control system 298 can also generate a timing signal 352 that indicates when seeds will be output from seed delivery subsystem 324 into the furrow 182. The timing signal 352 can be used by optical sensor control system 125 to control actuation of optical sensor 123 in order to capture an image at a desired time (such as an image of the seed in the furrow, an image of the furrow between seeds, etc.).

Material application control system 113 receives sensor signals 287 and/or other information and generates a control signal 350 to control the material application subsystem 326. Material application timing system 306 receives sensor signals 287 and/or other inputs and generates a control signal 350 to control material application subsystem 326 in order to apply material at a desired location, and/or at a desired time, within the field. Application control signal generator 308 receives the timing signal from system 306 and generates the control signals 350 to control the material application subsystem 326 at the desired time. The timing signals 352 output by seed timing system 300 and application timing system 306 can also be provided to optical sensor control system 125 in order to control optical sensor 123 to capture an image at a desired time and/or location in the field to obtain information of interest.

Optical sensor synchronization system 314 can receive timing signals 352 and synchronize the control signals generated by optical sensor control signal generator 316 so that optical sensor 123 captures an image of the information that is desired. For instance, when the timing signals 352 indicate when seeds are going to be released by seed delivery subsystem 324, 6 and assuming that optical sensor 123 is to capture images of the seeds in the furrow, then optical sensor synchronization system 314 synchronizes the control of the optical sensor 123 (considering its latency in actuation, it's location relative to the outlet end of the seed delivery subsystem 324, its field of view, and other variables) to ensure that optical sensor 123 captures an image that includes the seed in the furrow.

Figure 7A:
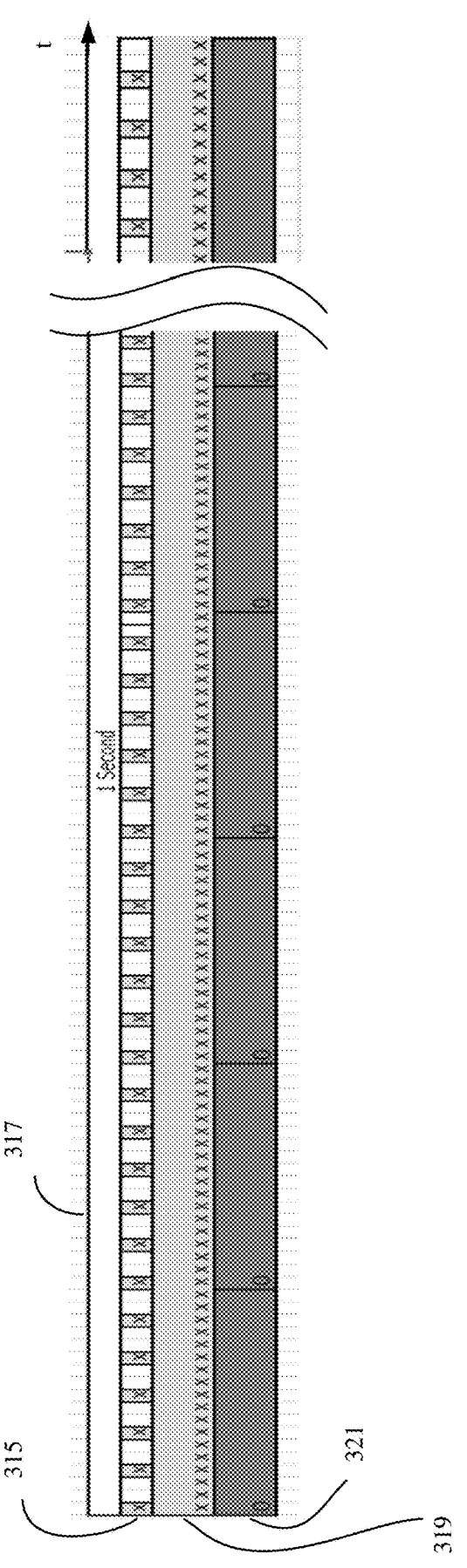
FIG. 7A depicts one example of the timing of image capture device actuations relative to seeding events.

As discussed above, it may be that optical sensor 123 is incapable of operating at a frequency where it can capture images of every seed in the furrow. In that case, optical sensor synchronization system 314 may synchronize the actuation of optical sensor 123 so that it captures an image of every other seed, every 5th seed, every Nth seed, etc., depending on the frequency with which optical sensor 123 can capture images, and depending on the frequency with which seeds pass through the field of view of optical sensor 123. FIG. 7A shows one example of the timing of the actuation of optical sensor 123 relative to seeding events. For instance, FIG. 7A shows one example of seeding events 315 for corn depicted along a timeline 317. FIG. 7A also shows one example of seeding events 319 for soybeans along timeline 317, and camera actuation events 321 along timeline 317. FIG. 7A shows that the seed population for soybeans is relatively high, such as a seed population requiring seed delivery system 116 to deliver seeds at a rate of 120 seeds/s. In such an example, optical sensor 123 may be operated to capture an image of every 18th seed. FIG. 7A also shows that the seed population for corn is relatively low, such as a seed population which leads to seeds being output from seed delivery subsystem 116 at a rate of 40 seeds per second. In such an example, optical sensor 123 may be controlled to capture an image of every 6th seed. These are just examples and optical sensor 123 may be operated at a different frequency to ensure that the images captured by optical sensor 123 are capturing the desired information, or a sampling of the desired information.

Optical sensor synchronization system 314 thus outputs information that can be used to derive when optical sensor 123 should be actuated, or the speed at which the controllable shutter 282 should be actuated, or another optical sensor control output. In response, optical sensor control signal generator 316 generates an output signal to actuate optical sensor 123, to adjust the speed of controllable shutter 282, or another control signal.

In one example, images captured by optical sensor 123 can be provided to image processing feedback system 318. Image processing feedback system 318 can process the images (or they can be processed elsewhere and used by system 318) to determine whether the images contain the desired information. For instance, where the images is to contain an image of the seed in the furrow, then image processing feedback system 318 can process the image to identify the seed within the image and provide a feedback signal to optical sensor synchronization system 314 indicating where the seed is located in the image, whether the seed is missing from the image, etc. In response, optical sensor synchronization system 314 can adjust its control output so that the image is taken earlier, later, or maintained at its current temporal position.

Seed metering subsystem 332 can include the seed meters 114 described above, or other seed meters. The seed meters can be driven by individual motors which can be controlled by control signals 350 to control the speed of the seed metering subsystem. Seed metering subsystem 322 can include other items or be controlled in other ways as well.

Seed delivery subsystem 324 can include the seed delivery system 116 discussed above, or other seed delivery systems. The assistive seed delivery system can be driven by a 18 separate motor which can be controlled by control signals 350. The seed delivery subsystem 324 can include other items as well.

Material application subsystem 326 can include actuators (e.g., valves or nozzles) 109, pumps 115, nozzles, and/or any other items that are used to apply material. Control signals 350 can be used to control the items in material application subsystem 326.

Propulsion/steering subsystems 328 can include an engine, motors that drive towing vehicle 94, a transmission, ground-engaging elements such as wheels or tracks, and any other items that can be used to propel machine 100 or towing vehicle 94 in a desired direction.

Figure 8:
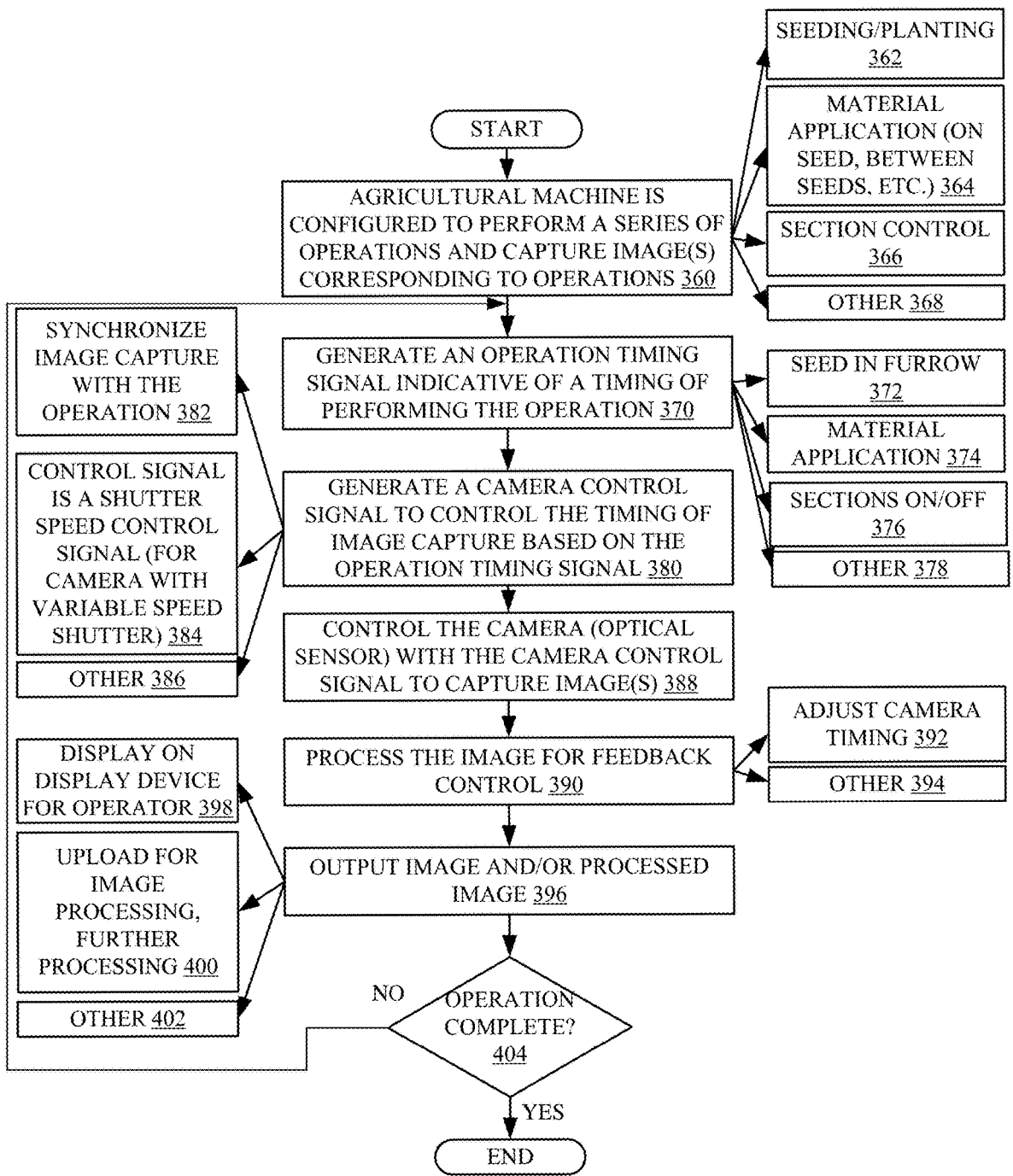
FIG. 8 is a flow diagram of one example operation of an agricultural machine architecture (or agricultural system).

FIG. 8 is a flow diagram illustrating one example of the operation of agricultural system 250 in controlling the actuation of optical sensor 123 to capture images of desired information. In the example described with respect to FIG. 8, it is assumed that an agricultural machine (e.g., machine 100) is configured to perform a series of agricultural operations such as outputting a seed to the furrow and/or applying material to the furrow by intermittently repeating those operations. It is also assumed that the agricultural machine is configured with an image capture device 123 to capture images corresponding to the agricultural operations. Configuring a machine in this way is indicated by block 360 in the flow diagram of FIG. 8. As mentioned, the operations can be seeding or planting operations 362 in which seeds are placed in a furrow by a seed delivery system 116. The operations can be material application operations 364 in which material is applied in the furrow, such as at the seed locations, between the seed locations, to the side of the seed locations, etc. The operations can be section control operations in which sections of the agricultural machine are turned on or off, as indicated by block 366 in the flow diagram of FIG. 8. The operations can be other agricultural operations 368 as well.

The actuation control system 260 then generates a timing signal 352 indicative of a timing during which the operation will be performed. Generating a timing signal is indicated by block 370 in the flow diagram of FIG. 8. The timing signal 352 can indicate when a seed will be placed in the furrow, as indicated by block 372, or when material application will be performed, as indicated by block 374. The timing signal may control controllable subsystems 260 to turn them on and off in sections, in order to perform section control, as indicated by block 376. The operation timing signal can indicate the timing of any of a wide variety of other operations as well, as indicated by block 378.

Optical sensor control system 125 then generates a camera control signal to control the timing of the actuation of optical sensor 123 based on the timing signal 352. Generating the camera control signal is indicated by block 380 in the flow diagram of FIG. 8. In one example, optical sensor synchronization system 314 synchronizes the actuation of optical sensor 123 with the timing signal indicating the timing of the operation being performed (seeding/planting, material application, section control, etc.) as indicated by block 382 in the flow diagram of FIG. 8. The optical sensor control signal generator 316 can generate the control signal to control the shutter speed of the controllable shutter 282, as indicated by block 384. The control signal can be generated in other ways as well, as indicated by block 386. Optical sensor control system 125 controls the camera (or other optical sensor 123) with the camera control signal in order to capture images of interest, at the desired time, as indicated by block 388 in the flow diagram of FIG. 8.

Image processing feedback system 318 can process the images (or they can be processed elsewhere with the processing results being provided to system 318) and provide feedback to optical sensor synchronization system 314 in order to modify the timing of actuation of optical sensor 123 based upon the captured images. Processing the images for feedback control is indicated by block 390 in the flow diagram of FIG. 8. For instance, optical sensor synchronization system 314 can adjust the timing with which optical sensor 123 is actuated, as indicated by block 392. The control of optical sensor 123 can also be modified in other ways, based upon the image processing feedback, as indicated by block 394.

Agricultural system 250 can output the image and/or any processed images (based upon the captured image) as indicated by block 396 in the flow diagram of FIG. 8. This information can be output for display on an operator interface mechanism 96, as indicated by block 398. The information can be uploaded to other systems 332 for further processing, as indicated by block 400. The information can be output for control in other ways, or for other reasons as well, as indicated by block 402.

Until the operation is complete, as indicated by block 404, processing reverts to block 370 where the timing signals 352 are generated and used to control the timing of actuation of optical sensor 123.

It can thus be seen that the actuation of optical sensor 123 is correlated to events that optical sensor 123 is to capture in images. For example, when the image is intended to capture a seed in a furrow, then the optical sensor 123 is controlled based upon the placement of seed in the furrow. When the optical sensor 123 is intended to capture material application in the furrow, then the control of optical sensor 123 is based upon the material application operations. The actuation of optical sensor 123 can be synchronized to the events it is intended to capture so that the images captured by optical sensor 123 contain the desired information. In this way, a relatively low speed optical sensor 123 (e.g., is low speed compared to the frequency of the events it is intended to capture) can be used so that the images capture every Nth event or operation. This increases the quality of the content being captured in the images, thus enabling use of a much lower cost optical sensor 123 (e.g., a relatively low speed optical sensor 123 as opposed to a high speed optical sensor 123). This also increases accuracy and efficiency in the system.

It will be noted that the above discussion has described a variety of different systems, components, generators, sensors, and/or logic. It will be appreciated that such systems, components and/or logic can be comprised of hardware items (such as processors and associated memory, or other processing components, some of which are described below) that perform the functions associated with those systems, components, generators, sensors, and/or logic. In addition, the systems, components, generators, sensors, and/or logic can be comprised of software that is loaded into a memory and is subsequently executed by a processor or server, or other computing component, as described below. The systems, components, generators, sensors, and/or logic can also be comprised of different combinations of hardware, software, firmware, etc., some examples of which are described below. These are only some examples of different structures that can be used to form the systems, components, generators, sensors, and/or logic described above. Other structures can be used as well.

The present discussion has mentioned processors, processing systems, controllers and/or servers. In one example, these can include computer processors with associated memory and timing circuitry, not separately shown. The processors, processing systems, controllers, and/or servers are functional parts of the systems or devices to which they belong and are activated by, and facilitate the functionality of the other components or items in those systems.

Also, a number of user interface displays (UIs) have been discussed. The UIs can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, the mechanisms can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
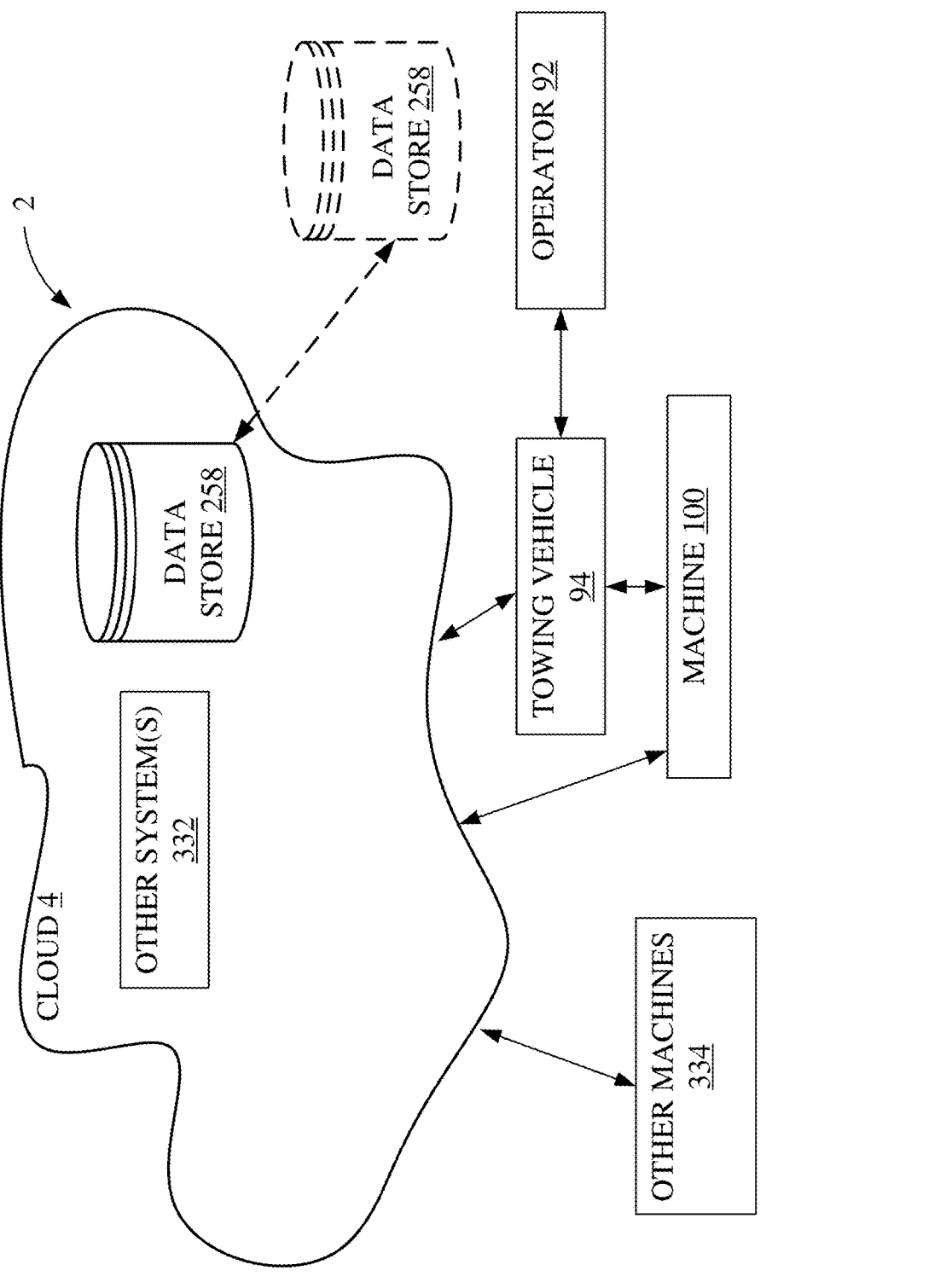
FIG. 9 is a block diagram showing one example of the architecture illustrated in FIG. 7, deployed in a remote server architecture.

FIG. 9 is a block diagram of one example of the agricultural machine architecture, shown in FIG. 7, where agricultural machine 100 communicates with elements in a remote server architecture 2. In an example, remote server architecture 2 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 7 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 9, some items are similar to those shown in FIG. 7 and they are similarly numbered. FIG. 9 specifically shows that other systems 337 and data store 258 can be located at a remote server location 4. Therefore, agricultural machine 100 and/or towing vehicle 94 accesses those systems through remote server location 4.

FIG. 9 also depicts another example of a remote server architecture. FIG. 9 shows that it is also contemplated that some elements of FIG. 7 are disposed at remote server location 4 while others are not. By way of example, data store 258 can be disposed at a location separate from location 4, and accessed through the remote server at location 4.

Regardless of where the items in FIG. 9 are located, they can be accessed directly by agricultural machine 100 and/or vehicle 94, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine until the agricultural machine enters a covered location. The agricultural machine, itself, can then send and receive the information to/from the main network.

It will also be noted that the elements of FIG. 7, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
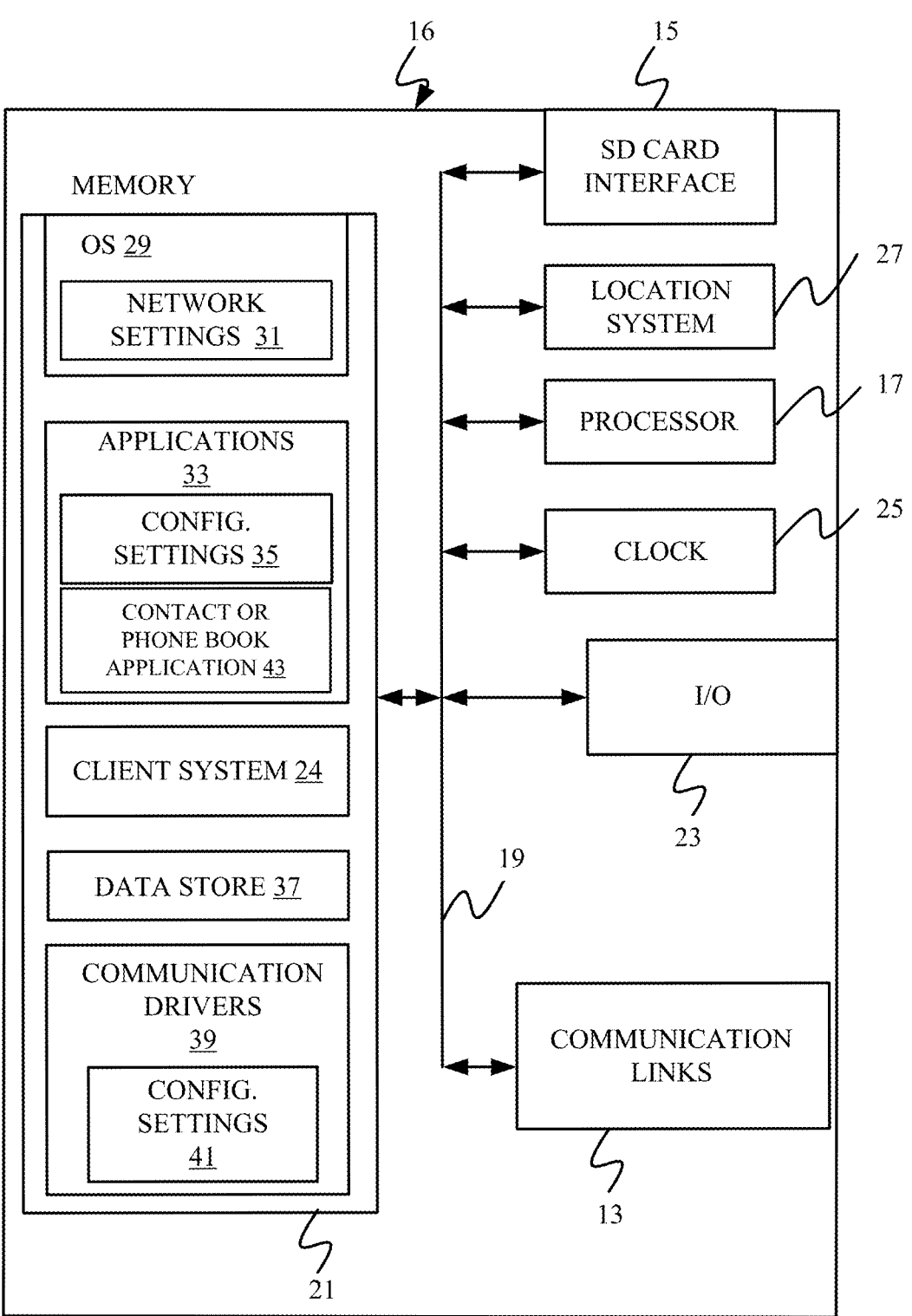
FIGS. 10-12 show examples of mobile devices that can be used in the architectures shown in the previous figures.
Figure 11:
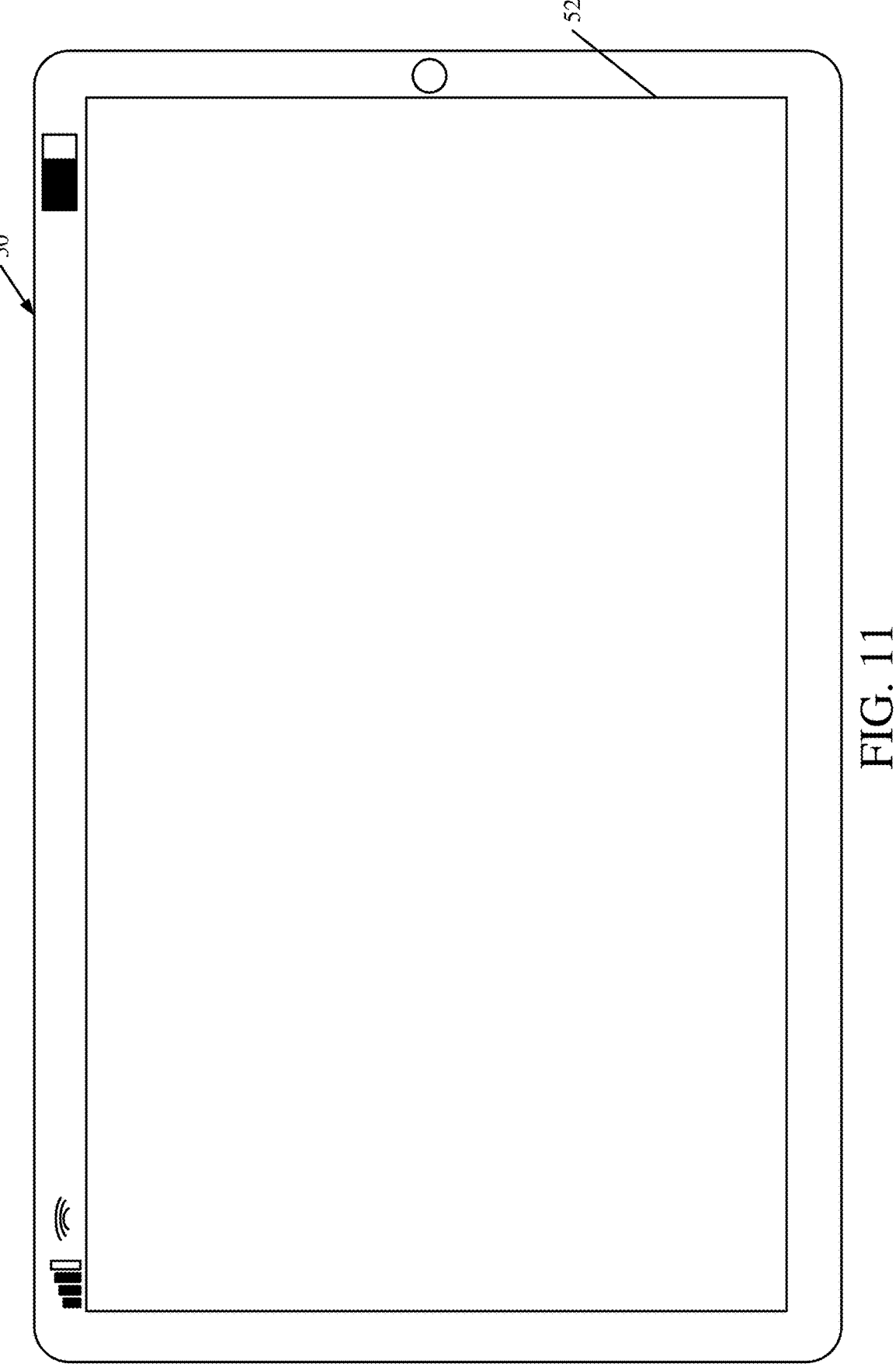
Figure 12:
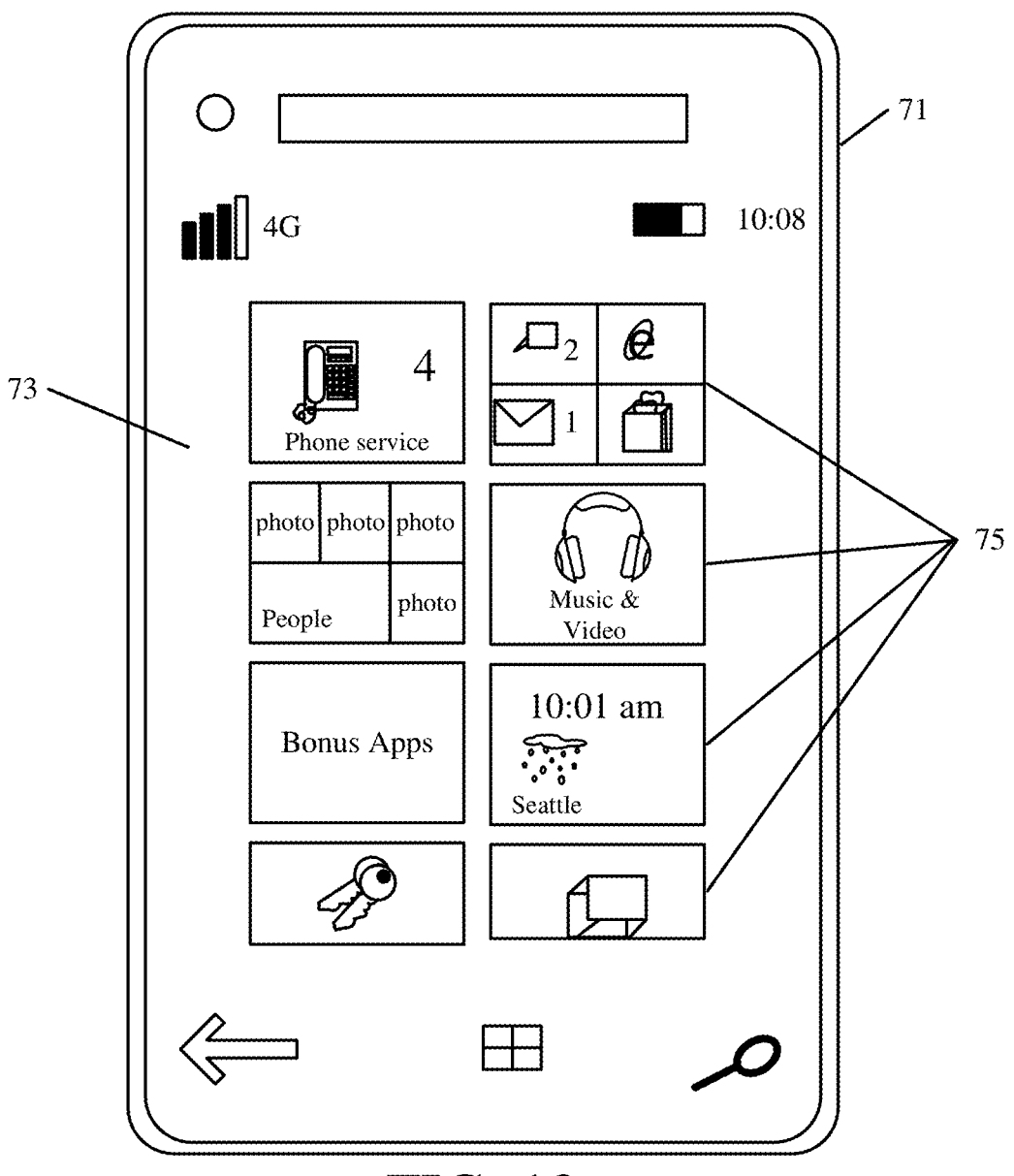

FIG. 10 is a simplified block diagram of one example of a handheld or mobile computing device that can be used as a user's or client's hand held device 16, in which the present system (or parts of it) can be deployed. For instance, a mobile device can be deployed in the operator compartment of towing vehicle 94 or as other system(s) 332. FIGS. 11-12 are examples of handheld or mobile devices.

FIG. 10 provides a general block diagram of the components of a client device 16 that can run some components shown in FIG. 7, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below).

Memory 21 stores computer readable instructions that, when executed by processor 17, cause the processor to perform computer-implemented steps or functions according to the instructions. Processor 17 can be activated by other components to facilitate their functionality as well.

FIG. 11 shows one example in which device 16 is a tablet computer 50. In FIG. 11, computer 50 is shown with user interface display screen 52. Screen 52 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 50 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
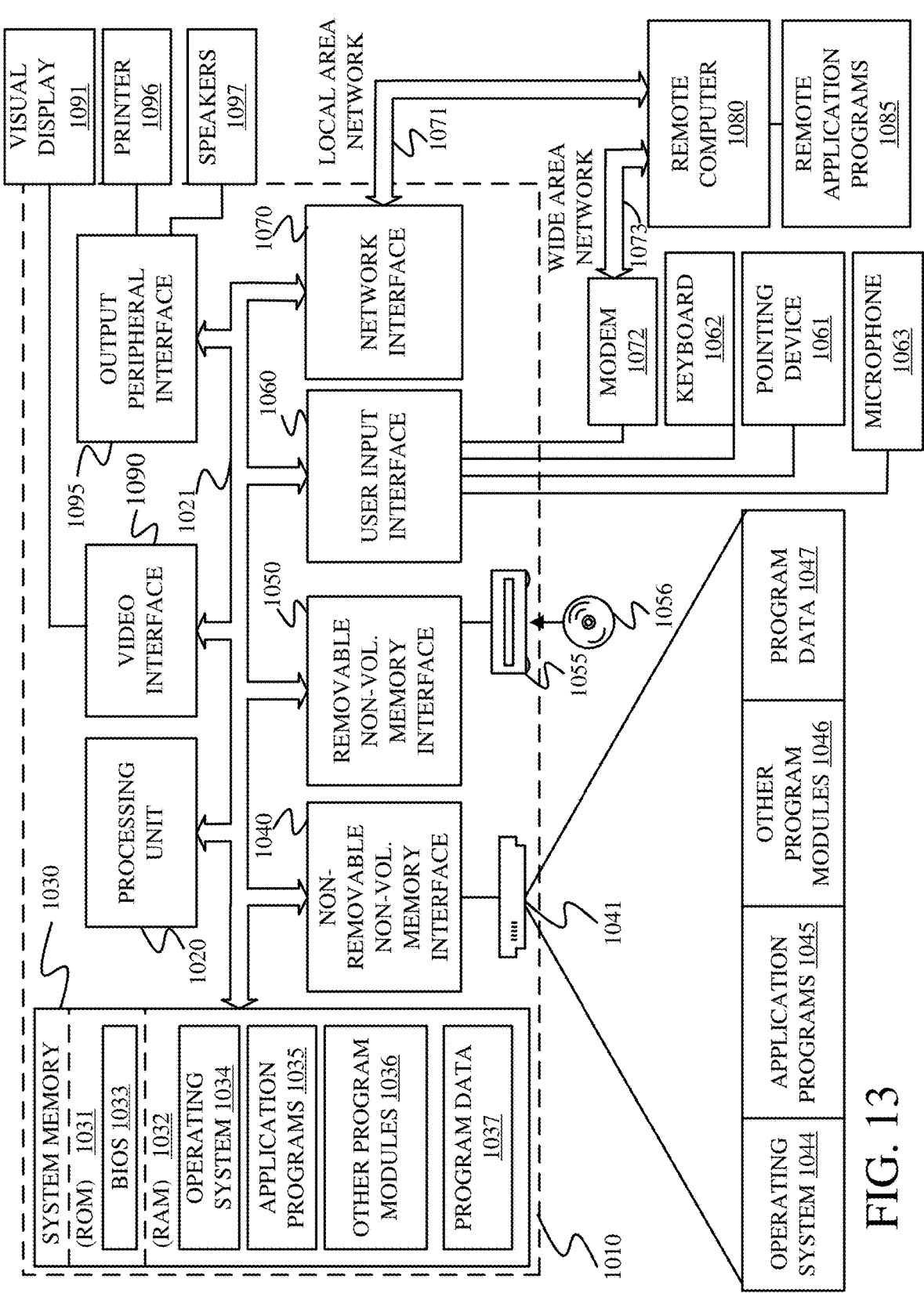
FIG. 13 is a block diagram showing one example of a computing environment that can be used in the architectures shown in the previous figures.

FIG. 13 is one example of a computing environment in which elements of FIG. 7, or parts of it, (for example) can be deployed. With reference to FIG. 13, an example system for implementing some embodiments includes a computing device in the form of a computer 1010 programmed to operate as described above. Components of computer 1010 may include, but are not limited to, a processing unit 1020 (which can comprise processors or servers from previous FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. Memory and programs described with respect to FIG. 7 can be deployed in corresponding portions of FIG. 13.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 13 illustrates operating system 1034, application programs 1035, other program modules 1036, and program data 1037.

The computer 1010 may also include other removable/non-removable volatile/nonvolatile computer storage media. By way of example only, FIG. 13 illustrates a hard disk drive 1041 that reads from or writes to non-removable, nonvolatile magnetic media, an optical disk drive 1055, and nonvolatile optical disk 1056. The hard disk drive 1041 is typically connected to the system bus 1021 through a non-removable memory interface such as interface 1040, and optical disk drive 1055 is typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FP-GAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 1010. In FIG. 13, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures. A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections (such as a local area network—LAN, or wide area network—WAN, or a controller area network—CAN) to one or more remote computers, such as a remote computer 1080.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. In a networked environment, program modules may be stored in a remote memory storage device. FIG. 13 illustrates, for example, that remote application programs 1085 can reside on remote computer 1080.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine comprising:
a controllable subsystem configured to perform a plurality of time-spaced agricultural operations at a first frequency;
a control system configured to control the controllable subsystem to perform the plurality of time-spaced agricultural operations and generate a timing signal responsive to timing of the plurality of time-spaced agricultural operations;
an optical sensor configured to capture an image; and
an optical sensor control system configured to generate an optical sensor control signal to control the optical sensor based on the timing signal to capture images at a second frequency, the first frequency being higher than the second frequency.

2. The agricultural machine of claim 1 wherein the controllable subsystem comprises:
a seeding subsystem that performs the plurality of time-spaced agricultural operations by intermittently performing a seeding operation outputting a seed into a furrow, the control system being configured to generate the timing signal to indicate timing of the seeding operation.

3. The agricultural machine of claim 2 wherein the optical sensor control system comprises:
a synchronization system controlling the optical sensor to capture an image of the seed in the furrow based on the timing signal.

4. The agricultural machine of claim 1 wherein the controllable subsystem comprises:
a material application subsystem that performs the plurality of time-spaced agricultural operations by intermittently performing a material operation applying material in a furrow, the control system being configured to generate the timing signal to indicate timing of the material operation.

5. The agricultural machine of claim 4 wherein the optical sensor control system comprises:
a synchronization system controlling the optical sensor to capture an image of the material in the furrow based on the timing signal.

6. The agricultural machine of claim 1 and further comprising:

an image processing feedback system that processes the image and provides a feedback signal to the optical sensor control system, the optical sensor control system generating the optical sensor control signal responsive to the feedback signal.

7. The agricultural machine of claim 1 wherein the optical sensor comprises:
a camera.

8. The agricultural machine of claim 7 wherein the camera has a shutter with a variable shutter speed and wherein the optical sensor control system is configured to generate the optical sensor control signal to control the shutter speed of the shutter.

9. A control system for controlling an agricultural machine, comprising:
an actuation control system configured to control a controllable subsystem to perform a plurality of time-spaced agricultural operations at a first frequency and generate an output signal responsive to timing of the plurality of time-spaced agricultural operations; and
an image capture control system configured to generate an image capture control signal to control an image capture device based on the output signal from the actuation control system to capture images at a second frequency, the first frequency being higher than the second frequency.

10. The control system of claim 9 wherein the controllable subsystem comprises a seeding subsystem that performs the plurality of time-spaced agricultural operations by intermittently performing a seeding operation outputting a seed into a furrow, the actuation control system being configured to generate the output signal to indicate timing of the seeding operation.

11. The control system of claim 10 wherein the image capture control system comprises:
a synchronization system configured to synchronize the image capture control signal with the timing of the seeding operation based on the output signal from the actuation control system to control the image capture device to capture an image of the seed in the furrow.

12. The control system of claim 9 wherein the controllable subsystem comprises a material application subsystem that performs the plurality of time-spaced agricultural operations by intermittently performing a material operation applying material in a furrow, the actuation control system being configured to generate a timing signal to indicate timing of the material operation.

13. The control system of claim 12 wherein the image capture control system comprises:
a synchronization system configured to synchronize the image capture control signal with the timing signal to control the image capture device to capture an image of the material in the furrow based on the timing signal.

14. The control system of claim 9 and further comprising:
an image processing feedback system configured to process the image and provide a feedback signal to the image capture control system, the image capture control system generating the image capture control signal responsive to the feedback signal.

15. A method of controlling an agricultural machine, comprising:
controlling a controllable subsystem to perform a plurality of time-spaced agricultural operations at a first frequency;
generating a timing signal responsive to timing of the plurality of time-spaced agricultural operations; and generating an image capture control signal to control an image capture device based on the timing signal to capture images at a second frequency, the first frequency being higher than the second frequency.

16. The method of claim 15 wherein the controllable subsystem comprises a seeding subsystem that performs the agricultural plurality of time-spaced agricultural operations by intermittently repeating a seeding operation outputting a seed into a furrow, wherein generating the timing signal comprises generating the timing signal to indicate timing of the seeding operation, and wherein generating an image capture control signal comprises:

generating the image capture control signal based on the timing of the repeated seeding operations indicated by the timing signal to control the image capture device to capture an image of the seed in the furrow.

17. The method of claim 15 wherein the controllable subsystem comprises a material application subsystem that performs the plurality of time-spaced agricultural operations by intermittently repeating a material operation applying material in a furrow, wherein generating the timing signal comprises generating the timing signal to indicate timing of the material operation, and wherein generating an image capture control signal comprises:

generating the image capture control signal based on the timing of the repeated material operations indicated by the timing signal to control the image capture device to capture an image of the material in the furrow.

\* \* \* \* \*